J. J. SNIGO.
ARMOR FOR PNEUMATIC TIRES.
APPLICATION FILED DEC. 13, 1916.
1,268,402.
Patented June 4, 1918.
2 SHEETS—SHEET 1.
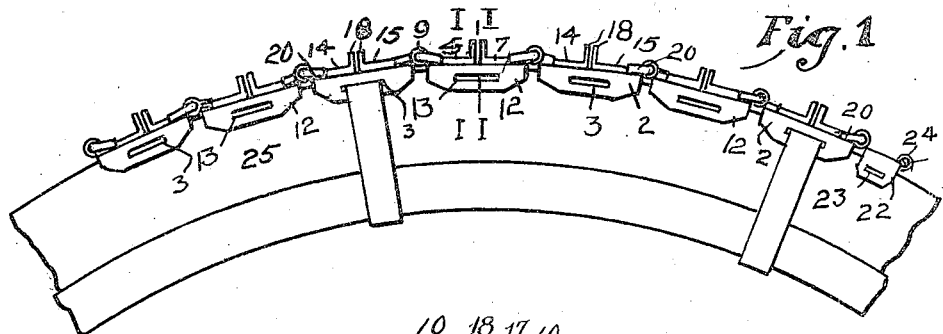
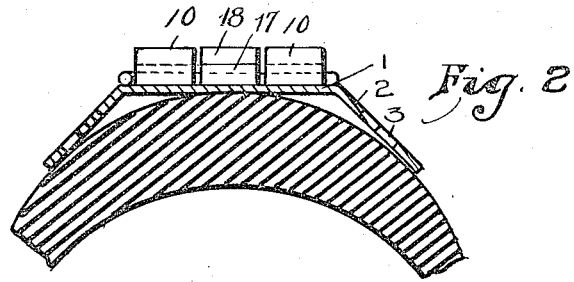
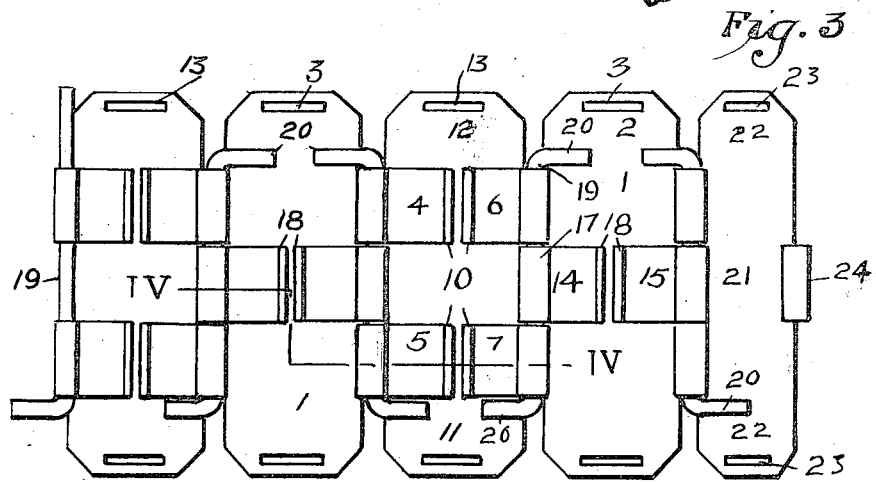
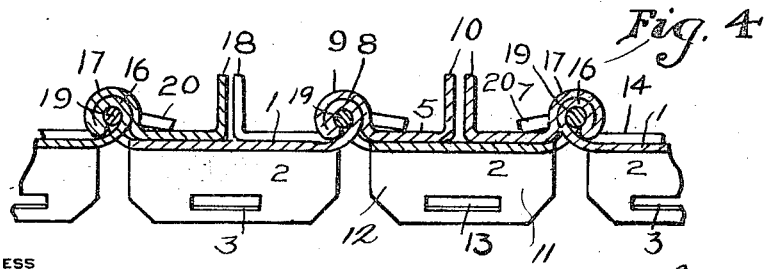
WITNESS
INVENTOR.

J. J. SNIGO.
ARMOR FOR PNEUMATIC TIRES.
APPLICATION FILED DEC. 13, 1916.
1,268,402.
Patented June 4, 1918.
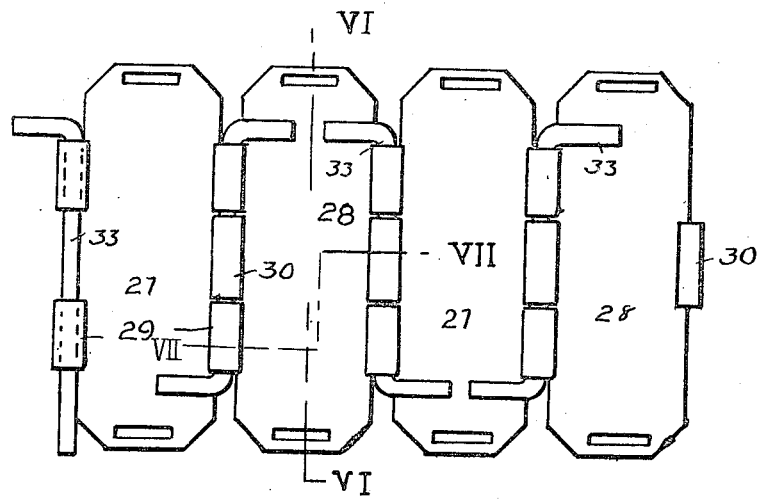
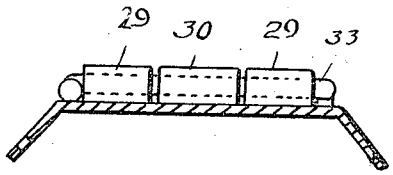
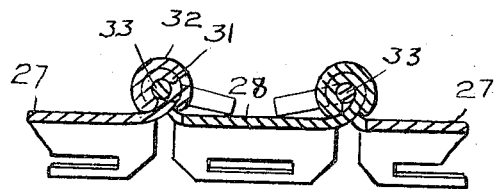
WITNESS
INVENTOR.

UNITED STATES PATENT OFFICE.

JAMES J. SNIGO, OF PITTSBURGH, PENNSYLVANIA.

ARMOR FOR PNEUMATIC TIRES.

1,268,402.  Specification of Letters Patent.  Patented June 4, 1918.

Application filed December 13, 1916. Serial No. 136,584.

*To all whom it may concern:*

Be it known that I, JAMES J. SNIGO, a citizen of the United States of America, residing at Pittsburgh, county of Allegheny, and State of Pennsylvania, have invented certain new and useful Improvements in Armors for Pneumatic Tires, of which the following is a specification.

This invention relates to an armor for pneumatic tires and has for its object to provide a device of such class, in a manner as hereinafter set forth, adapted to be positioned against the outer shoe of a tire and having means for reducing skidding and sluing to a minimum as well as further reducing the puncturing of the outer shoe to a minimum, under such conditions not only increasing the life of the inner tube, but also the durability of the tread of the outer shoe.

Further objects of the invention are to provide an armor for pneumatic tires which is comparatively simple in its construction and arrangement, strong, durable, efficient in its use, readily set up with respect to the tire, and embodying detachable tread elements which when one is damaged or injured it can be conveniently removed and a new one substituted which will not impair the cushioning characteristics of the tire, and comparatively inexpensive to manufacture.

With the foregoing and other objects in view the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is an elevation, broken away, of a portion of a tire, showing the adaptation therewith of an armor in accordance with this invention.

Fig. 2 is a section on line II—II, Fig. 1.

Fig. 3 is a plan of a portion of the armor.

Fig. 4 is a section on line IV—IV, Fig. 3.

Fig. 5 is a plan of a portion of a modified form of armor.

Fig. 6 is a section on line VI—VI, Fig. 5.

Fig. 7 is a section on line VII—VII, Fig. 5.

In both forms shown the armor comprises an annulus formed of two sets of tread elements, with the elements of one set alternately disposed with respect to the other set and hinged together and associated with the two sets of tread elements are what may be termed filling members employed for taking up slack when desired and which, when mounted in position, are hinged with the tread elements.

Referring to Figs. 1 to 4 of the drawings each of the tread elements of one set consists of a rectangular body portion 1 having the ends 2 thereof bent downwardly and provided with openings 3. Each longitudinal edge of a body portion 1 has projecting therefrom a pair of arms and the arms of one pair are indicated at 4, 5, and the arms of the other pair at 6, 7. Each of said arms 4 to 7 is bent to provide at the longitudinal edge of the body portion 1 a barrel consisting each of an inner cylinder 8 and an outer cylinder 9 and said cylinders are arranged in close contact. Each of the arms 4 to 7 is bent so as to seat upon the upper face of the body portion of an anti-skidding member of the other set and is then bent outwardly at right angles to provide an anti-skidding projection 10.

Each of the anti-skidding members of the other set consists of a rectangular body portion 11, having the ends 12 thereof bent downwardly and provided with openings 13. Centrally of each longitudinal edge of the body portion 11 an arm extends therefrom and one of said arms is indicated at 14 and the other at 15. Each of said arms 14, 15 is bent to provide, at the longitudinal edge of the body portion 11, a barrel consisting of an inner cylinder 16 and an outer cylinder 17. Said cylinders are arranged in close contact. Each of the said arms 14, 15 is furthermore extended to be seated upon the upper face of the body portion 1 and then bent at right angles to provide anti-skidding projections 18.

The barrels of the body portions 11 are positioned between the barrels of the body portions 1 and extending through the alining barrels are coupling members in the form of pins 19 which have angle shaped ends 20. The ends of each of the pins 19 extend in opposite direction with respect to each other. The pins are constructed of bendable material so when desired the ends 20 can be bent so that the pin can be withdrawn and a tread member removed when occasion so requires.

When the tread members of each set are set up the propections 10, of the arms 4, 5, oppose the projections 10 of the arms 6, 7, and the projections 18 of the arms 14 oppose the projection 18 of the arm 15.

The filling members which are used to take up slack when desired consist each of a rectangular body portion 21 having the ends 22 thereof bent downwardly and provided with openings 23 and centrally of each longitudinal edge of the body portion 21, a barrel 24 is provided which is constructed similar to the barrels carried by the body portions 1 and 11. The filling members are connected to the tread members in the same manner as the tread elements are connected together.

The openings 3, or 13, or 23, are employed for securing the annulus upon the tire 25, by straps, as illustrated in Fig. 1.

Referring to Figs. 5, 6, and 7, which illustrate a modified form, the construction is similar to that as shown in Figs. 1 to 4, with this exception, that the arms which are formed integral with the longitudinal edges of the elements are not extended to engage the upper face of the tread elements and are not bent to provide the tread projections. In Figs. 5, 6, and 7, the tread elements of one set are indicated at 27 and of the other set at 28. The barrels which are formed by the arms of the tread elements 27 are indicated at 29 and those of the tread elements 28 at 30. Each of the arms of a tread element 27, or 28, is bent so as to provide a barrel consisting of an inner cylinder 31 and an outer cylinder 32. The tread elements 27 and 28 are coupled together by pins 33 similar in construction and arrangement to the pins 19.

The barrels are reinforced in a manner as stated to act as anti-skidding devices when the projections 18 and 10 are worn down or when the projections 10 and 18 are dispensed with.

What I claim is:—

1. An armor for pneumatic tires consisting of an annulus comprising a series of tread elements having arms each bent upon itself to provide a reinforced barrel, each of said barrels consisting of a pair of cylinders, one arranged within and abutting against the other, the barrels of one element alining with the barrels of an adjacent element, and coupling members extending through the alining barrels for hinging said elements together.

2. An armor for pneumatic tires consisting of an annulus comprising a series of tread elements having arms bent to provide barrels, each of said barrels consisting of an inner and outer cylinder, the barrels of one element alining with the barrels of an adjacent element, and coupling members extending through the alining barrels for hinging said elements together, said arms extended from the barrels, the arms of one element resting upon the upper face of an adjacent element and bent at right angles to provide anti-skidding projections.

3. An armor for pneumatic tires consisting of an annulus comprising a series of tread elements having arms bent to provide barrels, each of said barrels consisting of an inner and outer cylinder, the barrels of one element alining with the barrels of an adjacent element, and coupling members extending through the alining barrels for hinging said elements together, said arms extended from the barrels, the arms of one element resting upon the face of an adjacent element and bent at right angles to provide anti-skidding projections, and each of said coupling members consisting of an elongated pin having angle shaped ends.

4. An armor for pneumatic tires consisting of an annulus comprising two sets of tread elements, each of the elements of one set provided with a pair of arms projecting from each longitudinal edge, each of the elements of the other set provided with an arm projecting from each longitudinal edge, the tread elements of one set being alternately disposed with respect to the tread elements of the other set, each of said arms bent to provide barrels, each consisting of an inner and outer cylinder in close contact, the barrels of one element alining with the barrels of the other element, and coupling members extending through the alining barrels for hinging the tread elements together.

5. An armor for pneumatic tires consisting of an annulus comprising two sets of tread elements, each of the elements of one set provided with a pair of arms projecting from each longitudinal edge, each of the elements of the other set provided with an arm projecting from each longitudinal edge, the tread elements of one set being alternately disposed with respect to the tread elements of the other set, each of said arms bent to provide barrels, each consisting of an inner and outer cylinder in close contact, the barrels of one element alining with the barrels of the other element, and coupling members extending through the alining barrels for hinging the tread elements together, and filling members interposed between certain of said tread elements and hinged therewith.

In testimony whereof I affix my signature in the presence of two witnesses.

JAMES J. SNIGO.

Witnesses:
MAX H. SROLOVITZ,
LUELLA H. SIMON.

Copies of this patent may be obtained for five cents each, by addressing the "Commissioner of Patents, Washington, D. C."